Feb. 19, 1957  H. H. CLUTE  2,781,944
RECESSED HOUSING FOR VALVES AND FITTINGS
FOR LIQUID PETROLEUM PRODUCT TANKS
Filed Dec. 13, 1954
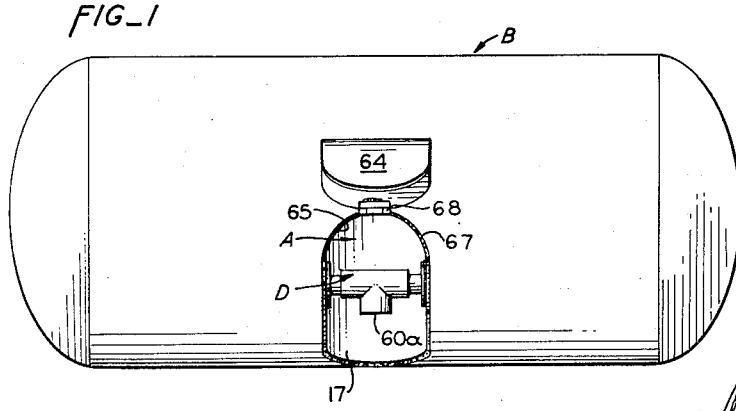
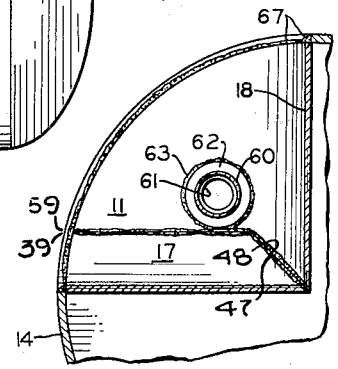
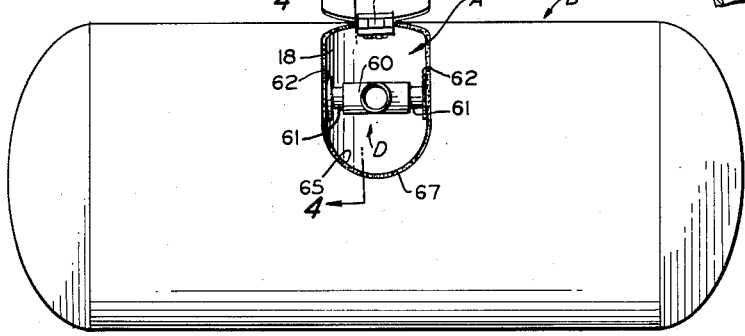
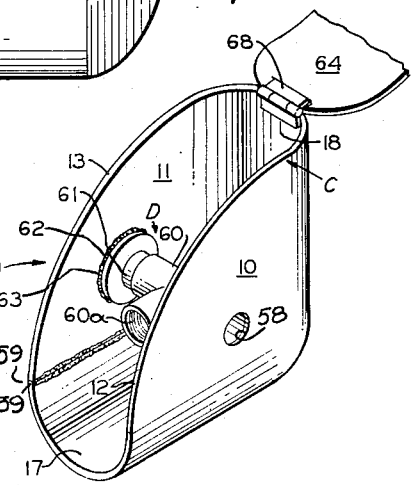
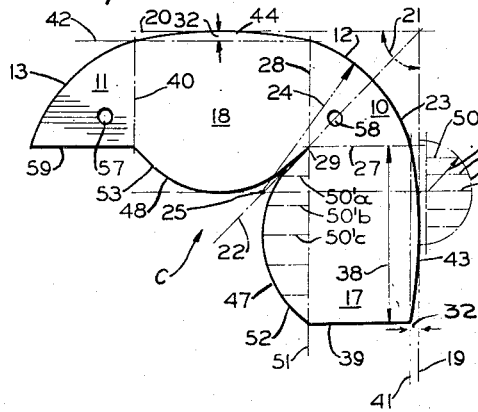
INVENTOR.
HENRY H. CLUTE
BY
Hansen and Lane
ATTORNEYS

United States Patent Office 2,781,944
Patented Feb. 19, 1957

2,781,944

RECESSED HOUSING FOR VALVES AND FITTINGS FOR LIQUID PETROLEUM PRODUCT TANKS

Henry H. Clute, San Mateo, Calif.

Application December 13, 1954, Serial No. 474,800

3 Claims. (Cl. 220—62)

The present invention relates to a tank housing, and pertains more particularly to a simplified and improved one-piece recessed valve housing for mounting in a tank of the type for containing liquid and gaseous petroleum products.

The tank compartment of the present invention is of one piece formed and welded construction arranged for mounting in a segmental opening in a side wall of a tank, the compartment being braced laterally by means which also constitute a passage for fluid products to and from the tank.

In tanks for petroleum products such as, for example, butane, it is necessary that valves and control fittings be mounted on the tank. It is desirable to have these valves and fittings protected from exposure to the weather and damage by impact from extraneous objects. Frequently these valves and fittings are mounted in recessed compartments of the type shown, for example in Patent No. 2,609,964. Such recessed housings, while adequate for their intended purpose, require dies or patterns for their manufacture. Since a separate size of housing must be provided for each diameter of tank in which the housing is intended to be installed, such prior art housings are not, therefore, readily available for manufacture by the small tank manufacturer or service organization requiring only one or a few at a time.

I have now devised an improved recessed compartment for installation in tanks of various diameters, and one which can be easily fabricated from a section of metal plate of the same type as that from which the tank itself is fabricated. This makes for uniformity of wall thickness throughout both the tank and housing, which facilitates welding the various parts together. My improved structure also provides cross bracing for the compartment, the bracing means also providing a duct for input and outage of the fluid products which the tank is intended to contain.

The compartment of the present invention, being fully recessed within the confines of the wall of the tank itself, is protected from damage, and the section of the tank which is removed for providing an opening for receiving the compartment may be employed as a closure for the compartment after the latter has been installed in the tank.

The compartment of my invention is constructed from a blank of sheet or plate metal which preferably is similar to that from which the tank is made in which the compartment is to be installed. The edges of the blank for the compartment consist of a plurality of variously curved sections and straight lines so arranged that upon bending the blank into a predetermined conformation involving trough-shaped end portions and straight segmental side wall portions a one piece compartment of desired size and shape will be formed. The straight side wall portions are disposed opposite each other and are cross braced one to the other by a tubular duct fitting which which is mounted to register with a pair of openings formed in the straight side wall portions.

The marginal conformation of the completed compartment conforms with the outline of an opening cut in the tank wall so that when the compartment is inserted flush with the tank in said opening, it will conform exactly thereto. The marginal portion of the compartment then is welded to the edge of the segmental opening cut in the tank wall to secure the compartment in hermetically sealed relation with the tank.

The invention contemplates the provision of an improved and simplified recessed compartment structure for use in tanks of curved cross sectional shape. The invention also provides a simple and easily fabricated recessed compartment for tanks, the compartment being fabricated from a flat piece of sheet or plate metal formed and welded to fit into correspondingly shaped opening in the tank wall.

The recessed tank compartment of my invention also has the side walls thereof stiffened and cross braced by a duct, which provides a flow path for the contents of the tank in which the compartment is mounted, a cover for the compartment being provided by a segment of the tank wall which is removed to provide an opening for the mounting of the compartment.

These and other objects and advantages of the invention will be apparent from the following description and the accompanying drawings wherein:

Fig. 1 is a plan view of a tank having a recessed compartment embodying my invention mounted therein, a cover plate cut from the side wall of the tank to provide a segmental opening therein for the reception of the compartment being shown in open condition.

Fig. 2 is a side elevational view of Fig. 1.

Fig. 3 is a perspective view of the completed compartment as it appears before installation in the tank, a cover plate being shown hingedly mounted thereon.

Fig. 4 is a fragmentary vertical sectional view taken along line 4—4 of Fig. 2.

Fig. 5 is a plan view in reduced scale of the blank used for fabricating the compartment shown in Figs. 1 to 4 inclusive, various lines for laying out the blank being shown in broken lines.

A recessed compartment A shown in tank B of the accompanying drawings comprises a pair of generally triangular, flat, side wall portions 10 and 11 (Fig. 3) the outer edges 12 and 13 respectively of which in the completed compartment are curved to conform to the curvature of the generally cylindrical side wall 14 of the tank B in which the compartment is to be mounted. These generally triangular side wall portions are connected by transversely extending end portions 17 and 18 respectively. As illustrated and described herein these transversely extending wall portions 17 and 18 are bent to form troughs of semi-circular cross sectional configuration.

In order to form the compartment A, a blank C (Fig. 5) is cut from sheet or plate metal preferably corresponding approximately to that of the tank B in which the compartment is to be installed.

The blank C is generally of L-shape and may be laid out in the following manner: A pair of outer construction lines 19 and 20 are drawn to intersect each other to form a right angle 21. A construction line 22 then is drawn bisecting this angle 21 and a circular arc 23, having a radius 24 equal to the inside radius of the tank B in which the compartment is to be installed, is scribed from a center 25 on the bisecting line 22 tangent to the two construction lines 19 and 20.

A pair of construction lines 27 and 28 intersecting each other at an angle of 90° and parallel, respectively, to the outer construction lines 19 and 20 then are laid out from an intersecting point 29 on the bisecting line 22 at a selected distance outwardly from the point 25. The greater the distance between the points 25 and 29, the wider the compartment A will be, and the smaller its triangular side walls 10 and 11. This fact will be more readily apparent after the entire layout and construction procedures are understood.

The length 38 of each of the two similar troughed wall portions 17 and 18 is found by describing a semi-circle, using as a radius the perpendicular distance from the point 25 to an extension 51 of the line 28. Obviously, if desired, the distance may be from the point 25 to an extension, not shown, of the line 27, since these distances are identical to each other. This semi-circle may be the construction line 37. The length of this semi-circular line 37, which may be computed of course by multiplying the length of the radius 35 by pi (3.14159), is the length 38 of each of the troughed portions 17 and 18, and terminal lines 39 and 40 are drawn to mark the outer edges of the transversely extending troughed compartment end portions 17 and 18 respectively.

A pair of construction lines 41 and 42 are drawn parallel to the outer construction lines 19 and 20, respectively, one through each point of intersection of the arc 12 with the lines 17 and 18 defining the triangular wall area 10.

The distance 32 between the lines 19 and 41 and between the lines 20 and 42 is the depth of curves 43 and 44 which define the outer edges of the troughed bottom 17 and end wall 18 of the completed compartment. If desired, these curves 43 and 44 may be constructed exactly according to well known principles of sheet metal layout, but since the edges defined by these curves are to be welded to the tank wall 14, any slight discrepancy in their curvature may be either filled in or melted off by means of the welding torch when installing the compartment in its tank. Therefore, the curves 43 and 44 may be simple circular arcs tangent to the outer construction lines 19 and 20 respectively.

The inner edges 47 and 48 of the troughed portions 17 and 18 respectively may be developed in a well known manner by dividing the arc within semicircle 37, representing the cross sectional shape of the troughs 17 and 18, into a predetermined number of equal sections by lines 50a, 50b, 50c, etc., perpendicular to the diameter of the semicircle. The portion of the line 51 lying between the intersection point 29 and the line 39 then is divided into a similar number of sections by lines 50'a, 50'b, 50'c, etc., erected perpendicularly to the line 51. The line 51'a is of equal length with the line 50a, and the other prime numbered lines are of equal length with their unprimed counterparts. A curve 52 then is drawn through the outer ends of the lines 50'a, 50'b, etc., which curve defines the inner edge of the troughed wall portion 17. A curve 53 defining the inner edge of the other troughed wall portion 18 is similar to the curve 52, and may either be transferred from the curve 52 in a conventional manner, or constructed independently in the manner described herein for the curve 52.

The second triangular wall portion 11 is similar in size and shape to the first triangular wall portion 10, and is mounted on the other end of the leg of the L-shaped blank C defined by the transverse wall portion 18. The second triangular wall portion 11 is laid out with a side thereof on the line 40 marking the outer edge of the troughed portion 18 and the curved outer edge 13 thereof directed oppositely to the similarly curved edge 12 of the triangular wall portion 10.

Holes 57 and 58 then are drilled in corresponding positions in the triangular side wall portions 11 and 10 respectively to register with the ends of a duct in a combined duct and bracing fitting D which is installed in the compartment A when completed as shown in Figs. 1 to 4 inclusive.

The blank C then is cut out to the form illustrated, in solid lines in Fig. 5, and the transverse wall portions 17 and 18 are bent to semi-cylindrical trough shape as shown in Figs. 1 and 2. This forming of the blank C brings the straight outer edge portion 39 of the transverse wall portion 17 into abutting relation with the edge 59 of the triangular wall portion 11 as shown in Figs. 3 and 4, and also brings the curved inner edges 47 and 48 of the troughed portions 17 and 18 into adjoining relation with each other as shown in Fig. 4.

The abutting edge portions 39 and 59, and the adjoining edge portions 47 and 48 then are welded together throughout their respective lengths to form the completed, hermetically sealed compartment A shown in Figs. 1, 2, 3 and 4.

The ducted brace fitting D is of a length to fit closely between the flat triangular side wall portions 10 and 11 of the tank. As illustrated in Figs. 1, 2, 3 and 4, this fitting D may consist of a T 60 with a pair of short extensions 61 mounted one in each end of the straight run of the T to register with the holes 57 and 58 respectively. A pair of flanges 62 are provided one on each end of the extensions 61 to fit against the triangular side walls 10 and 11, and these flanges are welded at 63 to their respective side walls 10 and 11.

In mounting the compartment A in a tank B, a segment 64 is cut from the tank wall 14 to provide an opening 65 of a size to receive the compartment A in interfitted relation therein. The compartment A is inserted in this opening 65 as shown in Figs. 1, 2 and 4 with the marginal edge of the compartment approximately flush with the inside of the tank wall. The marginal edge of the compartment A then is welded at 67 (Figs. 1, 2 and 4) to the correspondingly shaped marginal edge of the tank wall surrounding the opening 65 to seal the compartment hermetically to the tank. By mounting the compartment A with its marginal edge flush with the inside of the tank wall, the weld 67 thus may be built up to the full thickness of both the tank and compartment walls as shown in Fig. 4 to make a strong leak-proof weld.

The segment 64 of the tank wall 14 which is removed to make the opening 65 to receive the compartment A may be mounted, as by a hinge 68 (Figs. 1, 2 and 3) within the upper end of the compartment A to provide a closure for the compartment. Suitable valves or fittings (not shown) of a desired type may be mounted on the side outlet 60a of the T fitting 60 as desired to communicate through the fitting 60 and the registering holes 57 and 58 with the interior of the tank B.

The invention provides a simple and easily made recessed compartment which can be fabricated of any suitable width to fit the requirements of individual tank installations, and neither its fabrication nor its installation requires the use of any special equipment that would not be usually present in any shop capable of making ordinary tank repairs.

While I have described a preferred embodiment of the present invention, it will be understood however, that various changes and modifications may be made in the details thereof without departing from the spirit and scope of the invention as set forth in the appended claims.

Having thus described the invention, what I claim as new and desire to protect by Letters Patent is defined in the following claims.

I claim:

1. A recessed compartment formed from a single blank of flat metal sheet or plate material for installing in a marginally conforming segmental opening in the cylindrical side wall of a fluid storage tank of substantially similar material; said compartment comprising a pair of oppositely disposed triangular side walls spaced apart a predetermined distance and parallel to each other, an outer edge of each of said side walls being shaped to conform to the curvature of the side wall of a tank in which the compartment is installed, a troughed compartment bottom portion and a troughed compartment inner end portion both troughed portions being integral with said triangular wall portions, the inner edges of said troughed portions being formed to adjoin each other, and a side of one triangular wall portion being formed to adjoin an edge of one trough end portion the outer edges of both the troughed portions being shaped to conform to the curvature of the side wall of the tank in which the compartment is installed, a first weld joining the adjoining edges of said one triangular side wall and the adjoining edge of one of said troughed portions, and a second weld joining the adjoining inner edges of said troughed portions to each other, said welds being continuous.

2. A recessed compartment for installing in a marginally conforming segmental opening in the cylindrical side wall of a sheet or plate metal fluid storage tank; said compartment comprising a single piece of sheet or plate metal cut and formed to comprise a pair of oppositely disposed triangular side walls spaced apart a predetermined distance, the outer edges of said side walls being shaped to conform to the curvature of a tank in which the compartment is installed, a pair of transversely extending wall portions integral with said triangular wall portions, the inner edges of said transverse wall portions being shaped to adjoin each other and an edge of one triangular side wall being positioned adjoining an edge of one of said transversely extending wall portions, the outer edges of both transverse wall portions being formed to conform to marginal edge portions of the tank around the opening therein in which the compartment is installed, a first weld connecting the adjoining edges of said triangular side wall to said transverse wall portion, and a second weld connecting the adjoining inner edges of said transverse wall portions to each other, the second weld being a continuation of the first.

3. An L-shaped blank of sheet or plate metal for making a recessed compartment for flush mounting in an opening of conforming shape in the cylindrically curved side wall of a fluid storage tank of predetermined radius; said blank comprising a pair of generally triangular, relatively reversed side wall portions at opposite ends of one leg of said blank, the opposite, outer edges of said triangular side wall portions being circularly curved with said predetermined radius, a first transverse wall portion in said one leg interposed between said triangular side wall portions and of a length for forming to trough shape of predetermined curvature, thereby to position the two triangular wall portions in predetermined spaced, parallel, opposed relation, a second transverse wall portion similar to the first and abutting a side edge of one triangular wall portion, thereby forming the other leg of the L-shaped blank, the inner edges of said transverse wall portions being curved to adjoin each other, and a side of the other triangular wall portion being formed to abut the outer end of the second transverse wall portion, when the two transverse wall portions are bent to their predetermined troughed curvature.

References Cited in the file of this patent

UNITED STATES PATENTS

| | | |
|---|---|---|
| 519,534 | James | May 8, 1894 |
| 1,109,557 | Tomagno | Sept. 1, 1914 |
| 2,319,844 | Black | May 25, 1943 |
| 2,583,915 | Whitley | Jan. 29, 1952 |
| 2,609,964 | Cadwell | Sept. 9, 1952 |

FOREIGN PATENTS

| | | |
|---|---|---|
| 2,987 | Great Britain | 1899 |